US012690609B2

(12) United States Patent
Bouchuiguir

(10) Patent No.: US 12,690,609 B2
(45) Date of Patent: Jul. 28, 2026

(54) AEROSOL GENERATING SYSTEM COMPRISING A CASE AND AN INHALATION DEVICE AND METHOD OF REMOVING THE INHALATION DEVICE FROM THE CASE

(71) Applicant: JT International SA, Geneva (CH)

(72) Inventor: Layth Sliman Bouchuiguir, Bellevue (CH)

(73) Assignee: JT International SA, Geneva (CH)

( * ) Notice: Subject to any disclaimer, the term of this patent is extended or adjusted under 35 U.S.C. 154(b) by 567 days.

(21) Appl. No.: 18/272,681

(22) PCT Filed: Jan. 27, 2022

(86) PCT No.: PCT/EP2022/051889

§ 371 (c)(1),
(2) Date: Jul. 17, 2023

(87) PCT Pub. No.: WO2022/162061

PCT Pub. Date: Aug. 4, 2022

(65) Prior Publication Data

US 2024/0074493 A1 Mar. 7, 2024

(30) Foreign Application Priority Data

Jan. 28, 2021 (EP) .................................... 21153984

(51) Int. Cl.

*A24F 15/01* (2020.01)
*A24F 40/40* (2020.01)
*H01F 7/02* (2006.01)

(52) U.S. Cl.

CPC .............. *A24F 15/01* (2020.01); *A24F 40/40* (2020.01); *H01F 7/02* (2013.01)

(58) Field of Classification Search

CPC ....................................................... A24F 40/95
See application file for complete search history.

(56) References Cited

U.S. PATENT DOCUMENTS

2013/0037042 A1 2/2013 Hearn et al.
2017/0150757 A1 6/2017 Worm et al.
(Continued)

FOREIGN PATENT DOCUMENTS

CN 202999282 U 6/2013
CN 106572708 A 4/2017
(Continued)

OTHER PUBLICATIONS

International Search Report for PCT/EP2022/051889 mailed Apr. 22, 2022. 4 pgs.

*Primary Examiner* — Eric Yaary
(74) *Attorney, Agent, or Firm* — Lerner David LLP

(57) ABSTRACT

An aerosol generating system includes a case and an inhalation device, which can be accommodated in the case. The case has a body and a lid movable relative to the body. The inhalation device and the lid have a combination of a magnet and a ferritic element, which cooperate to move the inhalation device relative to the body, when the lid is moved relative to the body. The lid has at least one sliding pin, which is slidable relative to the body, and on which the magnet or ferritic element is provided.

A method of removing at least one inhalation device from the case includes the step of removing the inhalation device partially from the case by cooperation of the magnet and the ferritic element and the lid to the effect that the inhalation device is moved relative to the body, when the lid is moved relative to the body.

13 Claims, 1 Drawing Sheet

(56) References Cited

U.S. PATENT DOCUMENTS

| | | | |
|---|---|---|---|
| 2017/0231285 | A1 | 8/2017 | Holzherr et al. |
| 2019/0289905 | A1 | 9/2019 | Alarcon |
| 2021/0015161 | A1 | 1/2021 | Moloney et al. |

FOREIGN PATENT DOCUMENTS

| | | | |
|---|---|---|---|
| CN | 207855032 | U | 9/2018 |
| CN | 210471021 | U | 5/2020 |
| CN | 111918570 | A | 11/2020 |
| JP | H10136964 | A | 5/1998 |
| JP | H10295353 | A | 11/1998 |
| KR | 20160100096 | A | 8/2016 |
| WO | 2011095781 | A1 | 8/2011 |
| WO | 2016075028 | A1 | 5/2016 |
| WO | 2017007252 | A1 | 1/2017 |
| WO | 2019081898 | A1 | 5/2019 |
| WO | 2020047728 | A1 | 3/2020 |

AEROSOL GENERATING SYSTEM COMPRISING A CASE AND AN INHALATION DEVICE AND METHOD OF REMOVING THE INHALATION DEVICE FROM THE CASE

CROSS-REFERENCE TO RELATED APPLICATIONS

The present application is a national phase entry under 35 U.S.C. § 371 of International Application No. PCT/EP2022/051889, filed Jan. 27, 2022, published in English, which claims priority to European Application No. 21153984.6 filed Jan. 28, 2021, the disclosures of which are incorporated herein by reference in their entireties.

TECHNICAL FIELD

The invention is related to an aerosol generating system comprising a case and an inhalation device as well as to a method of removing the inhalation device from the case.

In recent years, inhalation devices, such as e-cigarettes have become popular as a replacement for conventional smoking articles. In this context, the inhalation device is usually accommodated in a case, which can usually further accommodate one or more cartridges or similar components with an aerosol generating substrate.

Further, the case can have the function of a charger for supplying electric power to the inhalation device. Users usually find it convenient, when the inhalation device is removable from the case in a simple manner.

PRIOR ART

WO 2020/83850 A1 is related to a case for an aerosol generating device with a holder for receiving a portion of the aerosol generating device, wherein the holder can comprise a magnet for retaining the aerosol generating device in the holder.

EP 3 344 315 A1 discloses an aerosol generating system having a rectangular case, in which a side door can be opened to allow removal of the inhalation device, and a permanent magnet forming a lifting device can be provided in order to cause the inhalation device to rise up out of the case.

SUMMARY OF THE INVENTION

In view of the above, there remains a need for providing an aerosol generating system, which is both easy to manufacture and easy to use.

This is achieved by means of the aerosol generating system in accordance with claim 1.

Generally, the case for accommodating the inhalation device has a body and a lid movable relative to the body, and the inhalation device and the lid has a combination of at least one magnet and at least one ferritic element, which cooperate to move the inhalation device relative to the body, when the lid is moved relative to the body. In this context, the lid has at least one sliding pin, which is slidable relative to the body, and on which at least one magnet or ferritic element is provided.

In use, the lid can be considered a top part of the case and is particularly adapted to close and allow opening of a smallest surface of the case, which generally has a cuboid shape. The second smallest surfaces can be considered side surfaces, and the largest surfaces can be considered a front and a rear face. A lid, which is at least slidable relative to the body by means of the mentioned sliding pin, can be manufactured easily and can, by means of the magnet or ferritic element provided on the sliding pin, cooperate with the complementary element on the inhalation device to move the inhalation device relative to the body of the case in a manner to make it easily graspable by a user. At the same time, the case can be kept compact and also retains a compact size in a state, in which the lid is opened, as the lid is typically provided on a smallest surface of the case. Moreover, any wall thicknesses between magnets or ferritic elements on the sliding pin and/or the inhalation device can be made sufficiently small to allow the desired interaction so as to lift the inhalation device relative to the case.

Preferred embodiments are described in the further claims.

It further contributes to the user benefit, when the inhalation device can essentially be accommodated in its entirety in the cavity of the case. In this manner, the inhalation device is fully protected in a non-use state, and can, by means of the described interaction of one or more magnets and one or more ferritic elements be easily brought into a ready-to-use state.

It has further proven convenient, when the inhalation device is generally elongate, in particular substantially cylindrical, in particular circle cylindrical.

In this case, it is particularly advantageous, when plural magnets or ferritic elements are provided all around the inhalation device at a particular position along the length thereof. Additionally or alternatively, a magnet or ferritic element can be provided in a ring, annular or circular shape so as to extend all around the inhalation device. In this manner, the desired interaction with one or more magnets or ferritic elements on the sliding pin can be ensured independent of the rotational position of the inhalation device around its longitudinal axis. This is particularly beneficial, as the position of any magnet or ferritic element may not be visible from outside the inhalation device. Further, the features described in this paragraph are advantageous, for the reasons mentioned, independent from any other features described herein and can be provided independent from these on any aerosol generating system having a case and an inhalation device held by a combination of one or more magnets and ferritic elements.

In order to make the use thereof particularly simple and still keep the size of the aerosol generating system, also in an open state of the case, particularly compact, it is preferred to provide the lid not only, by means of the described sliding pin, slidable relative to the body, but also pivotable relative to the body.

In particular, the sliding pin can also be used as a pivot axis, so that the lid is additionally pivotable about at least one sliding pin and the structure can be kept simple.

Interaction between the lid and the case can be made simple and efficient and at the same time easy to manufacture, when the case has at least one groove for accommodating at least one sliding pin.

As already indicated above, in a preferred embodiment, the lid is provided on a smallest side surface of the body, which can be considered a top surface, as compared to lateral side doors or similar structures known in the prior art.

In this context, the lid does not necessarily have to cover only a smallest side surface, but can further extend adjacent a second smallest side surface of the body, in other words, typically a side surface as compared to a front or a rear surface. In particular, sliding pins of the lid can be provided in a portion thereof extending along such a side surface.

A method of removing an inhalation device from a case essentially corresponds to the above-described structure of the inhalation device and implies moving the inhalation device relative to the case or partially removing the inhalation device from the case by means of a cooperation of at least one magnet and at least one ferritic element provided as indicated above. Preferred embodiments of the method described herein correspond to preferred embodiments of the aerosol generating system, and it should be mentioned that any features mentioned in connection with the system only can be fully applied to the method and vice versa.

BRIEF DESCRIPTION OF THE DRAWINGS

Hereinafter, the invention will be described with reference to an exemplary embodiment and with reference to the drawings, in which.

DETAILED DESCRIPTION OF PREFERRED EMBODIMENTS

Figure 1:
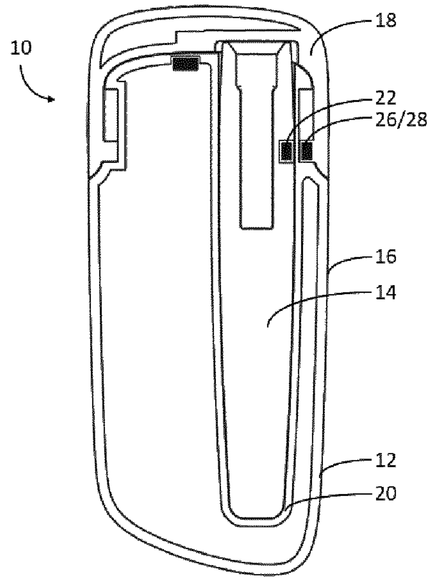
FIG. 1 shows the aerosol generating system in accordance with the invention in a first, closed state of the case.

As can be taken from FIG. 1, the aerosol generating system 10 generally has a case 12 and an inhalation device 14, the case having a body 16 and a lid 18. The inhalation device 14 is generally elongate and can be accommodated substantially completely in a cavity 20 of the case 12. In the embodiment shown, the cavity 20 extends almost completely to the bottom of the case 12, and the inhalation device 14 protrudes from the cavity in the closed state of the lid 18 shown in FIG. 1 merely by a few millimeters, if any. It is further indicated in FIG. 1, that the inhalation device 14 comprises a magnet or ferritic element 22 at a side thereof and in an upper part, which is, in particular, adjacent the lid 18 as described in more detail below.

Figure 3:
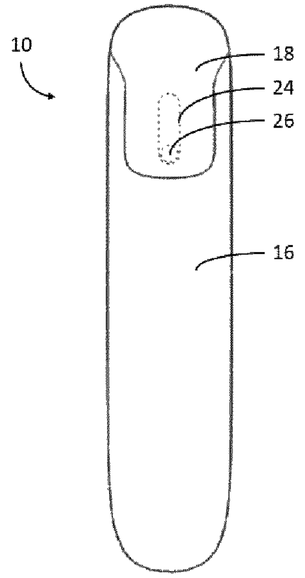
FIG. 3 shows the aerosol generating system in the state of FIG. 1 from a side thereof.

As can also be taken from the combination of FIGS. 1 and 3, the case 12 is generally cuboid, in which a front and a rear face, the front face pointing towards the viewer of FIG. 1, being the largest surfaces of the cuboid. As can particularly be taken from FIG. 3, the side surfaces are the second largest surfaces of the cuboid, and the lid 18 is essentially provided on a smallest surface of the cuboid. As shown in FIG. 1 at the bottom of the case, this small surface can be formed somewhat inclined towards one of the sides. In particular, although not shown in FIG. 1, this can be applied not only to the bottom of the case, but also the top thereof formed by the lid 18.

As shown in the figures, in the embodiment depicted, the lid not only covers the top of the body 16 of the case 12, but also extends a short distance along the front and rear surface (see FIG. 3), as well as a significantly longer distance, such as 10% to 30% thereof, of the lateral side surfaces. Moreover, in order to give the user a pleasant "feeling" of the case 12, some or preferably all edges between the various surfaces are rounded. Moreover, the smallest and second smallest surfaces, in other words, the top and bottom surface as well as the side surfaces can be rounded as a whole, as can be seen for the top and bottom surface in FIG. 3.

Figure 4:
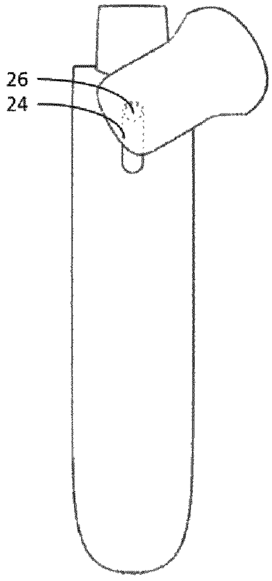
FIG. 4 shows the aerosol generating system in the state of FIG. 2 from a side thereof.

As indicated in FIGS. 3 and 4 by means of the dotted lines, in the embodiment shown, the case 12 has a groove 24 on each side, in which a sliding pin 26 of the lid 18 provided on each side is slidable. In the embodiment shown, each groove extends essentially parallel to the largest and second largest surfaces of the case 12 as well as parallel to the longitudinal extension of the inhalation device 14 Moreover, as can be taken from a comparison of FIGS. 3 and 4, the lid 18 is further pivotable relative to the body 16 around the sliding pin 26 on each side.

Figure 2:
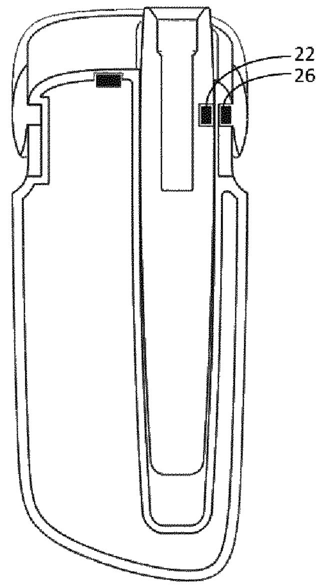
FIG. 2 shows the aerosol generating system in accordance with the invention in a second, open state of the case.

As can be seen from a combination of FIGS. 1 and 2, when the lid 18 slides upwards, the magnet or ferritic element 28 provided on the pin 26 cooperates with the corresponding magnet or element 22 on the inhalation device 14 so as to lift the latter from the body 16 of the case 12. In this manner, the inhalation device 14 can easily be grasped by a user. Whereas the lid can be provided so as to extend a longer distance along the side surfaces, in order to move the inhalation device out of the cavity 20 to allow grasping thereof, the fact that the lid 18 is additionally pivotable, as shown in FIG. 4, keeps the entire system compact, also in an open state.

It can, moreover, be taken from FIGS. 1 and 2, that the lid is formed symmetrically to a vertical axis with regard to the sliding pins 26, and the grooves 24 provided on the body 16, whereas the inhalation device 14 is provided in an asymmetric, in particular eccentric position in order to provide it in a position particularly close to the side surface, where the sliding pin 26 with the magnet or ferritic element 28 is present and can advantageously interact with the magnet or ferritic element 22 provided on the inhalation device. In particular, in the embodiment shown, the inhalation device is provided in the right half of the case 12 only. Moreover, as can be taken from FIG. 3 the case can be essentially symmetrical when viewed from the lateral side surfaces.

Figure 5:
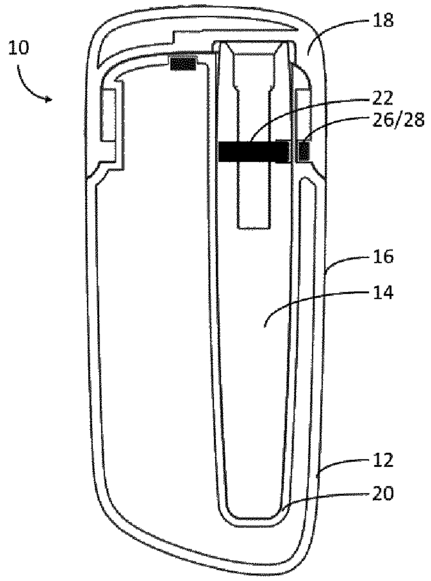
FIG. 5 shows an alternative embodiment in the state of FIG. 1.

As indicated in FIG. 5, magnets or ferritic elements 22 can be provided at the same position along the length thereof all around the inhalation device 14, in order to ensure the described lifting action independent of the rotational orientation of the inhalation device 14. In particular, FIG. 5 shows a ring shaped magnet or ferritic element 22. Moreover, the entire sliding pin 26, i.e. the portion protruding from the lid and/or accommodated in the groove 24, or a main part thereof can be constituted by the magnet or ferritic element 28.

The invention claimed is:

1. An aerosol generating system comprising:

a case and an inhalation device configured to be accommodated in the case, the case having a body and a lid movable relative to the body, wherein the inhalation device and the lid have a combination of at least one magnet and at least one ferritic element, which cooperate to move the inhalation device relative to the body, when the lid is moved relative to the body, and wherein the lid has at least one sliding pin, which is slidable relative to the body, and on which at least one magnet or ferritic element is provided.

2. The system of claim 1, wherein the inhalation device is configured to essentially be accommodated in its entirety in a cavity of the case.

3. The system of claim 1, wherein the inhalation device is elongate.

4. The system of claim 3, wherein the at least one magnet and at least one ferritic element comprising a plurality of magnets or ferritic elements or a ring shaped magnet or ferritic element, respectively, is provided all around the inhalation device at a predetermined position along the length thereof.

5. The system of claim 1, wherein the lid is pivotable relative to the body.

6. The system of claim 5, wherein the lid is pivotable about at least one sliding pin.

7. The system of claim 1, wherein the case has at least one groove for accommodating at least one sliding pin.

8. The system of claim 1, wherein the lid is provided on a smallest side surface of the body.

9. The system of claim 1, wherein the lid further extends adjacent at least one second smallest side surface of the body.

10. The system of claim 3, wherein the inhalation device is substantially cylindrical.

11. A method of removing at least one inhalation device from a case, the case having a body and a lid movable relative to the body, the method comprising the step of removing the inhalation device partially from the case by cooperation of at least one magnet and at least one ferritic element provided on the inhalation device and the lid to the effect that the inhalation device is moved relative to the body, when the lid is moved relative to the body, wherein the lid has at least one sliding pin, which is slidable relative to the body, and on which at least one magnet or ferritic element is provided.

12. The method of claim 11, wherein the lid is pivoted relative to the body.

13. The method of claim 11, wherein the lid is pivoted about at least one sliding pin, which is slid relative to the body.

* * * * *